US011982320B2

(12) United States Patent
Barrientos Blanco et al.

(10) Patent No.: US 11,982,320 B2
(45) Date of Patent: May 14, 2024

(54) TRANSMISSION

(71) Applicant: Ningbo Geely Automobile Research & Development Co., Ltd., Ningbo (CN)

(72) Inventors: Eva Barrientos Blanco, Gothenburg (SE); Henrique Budacs, Gothenburg (SE); Fredrik Sjöqvist, Torslanda (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 421 days.

(21) Appl. No.: 17/187,765

(22) Filed: Feb. 27, 2021

(65) Prior Publication Data
US 2021/0180654 A1 Jun. 17, 2021

Related U.S. Application Data

(63) Continuation of application No. PCT/CN2019/103375, filed on Aug. 29, 2019.

(30) Foreign Application Priority Data

Sep. 5, 2018 (EP) ..................................... 18192795

(51) Int. Cl.
*F16D 11/10* (2006.01)
*B60F 5/02* (2006.01)
(Continued)

(52) U.S. Cl.
CPC ................ *F16D 11/10* (2013.01); *B60F 5/02* (2013.01); *B64C 37/00* (2013.01); *B64D 35/00* (2013.01);
(Continued)

(58) Field of Classification Search
CPC ....... B64C 11/002; B64C 37/00; B64D 35/00; F16D 11/002; F16D 2011/008;
(Continued)

(56) References Cited

U.S. PATENT DOCUMENTS 2,486,672 A * 11/1949 Notestein ............... B64D 35/00
244/65
5,673,777 A * 10/1997 Ziech ...................... F16H 48/08
475/237
(Continued)

FOREIGN PATENT DOCUMENTS

CN 107933893 A 4/2018
CN 108482646 A 9/2018
(Continued)

OTHER PUBLICATIONS

International Search Report from corresponding International Application No. PCT/CN2019/103375, dated Dec. 4, 2019, 2 pages.

*Primary Examiner* — Richard M Lorence
(74) *Attorney, Agent, or Firm* — Tucker Ellis LLP

(57) ABSTRACT

A transmission includes a first component and a second component which are journaled for rotation relative to each other, and a locking mechanism for rotationally locking the first component and the second component relative to each other in a predetermined mutual rotation position. The locking mechanism includes a sleeve and a dog clutch, the sleeve being rotationally locked relative to the first component and the dog clutch being rotationally locked relative to the second component, the sleeve and the dog clutch being axially displaceable relative to each other for engagement of the sleeve and the dog clutch such that the first component and the second component are rotationally locked relative to each other, the sleeve and the dog clutch being engageable only in a mutual rotation position corresponding to the predetermined mutual rotation position of the first component and the second component.

19 Claims, 11 Drawing Sheets

(51) Int. Cl.
*B64C 37/00* (2006.01)
*B64D 35/00* (2006.01)
*F16D 11/00* (2006.01)
*F16D 23/02* (2006.01)
*F16D 23/14* (2006.01)

(52) U.S. Cl.
CPC .............. *F16D 23/02* (2013.01); *F16D 23/14* (2013.01); *F16D 2011/002* (2013.01)

(58) Field of Classification Search
CPC .......... F16D 11/10; F16D 23/02; F16D 23/06; F16D 23/14; F16D 71/00; F16D 71/04; F16D 2011/002; B60F 5/02
USPC .................................. 192/53.34, 69.9, 69.62
See application file for complete search history.

(56) References Cited

U.S. PATENT DOCUMENTS

| | | | | |
|---|---|---|---|---|
| 6,086,014 | A | * | 7/2000 | Bragg, Jr. ................. B60F 5/02 244/49 |
| 8,534,060 | B1 | | 9/2013 | Bennett |
| 8,714,327 | B2 | * | 5/2014 | Kim ........................ F16H 63/30 192/48.91 |
| 9,010,512 | B2 | * | 4/2015 | Mori ....................... F16D 11/10 192/108 |
| 2009/0066169 | A1 | | 3/2009 | Schweiher |
| 2016/0273593 | A1 | | 9/2016 | Cousins |
| 2018/0045252 | A1 | | 2/2018 | Omori |

FOREIGN PATENT DOCUMENTS

| | | |
|---|---|---|
| DE | 102004020863 A1 | 12/2004 |
| EP | 2639469 A | 9/2013 |
| FR | 2990253 A1 | 11/2013 |
| JP | S58203228 A | 11/1983 |
| KR | 20180047494 A | 5/2018 |
| WO | 2015099865 A1 | 7/2015 |

\* cited by examiner

TRANSMISSION

RELATED APPLICATION DATA

This application is a continuation of International Patent Application No. PCT/CN2019/103375, filed Aug. 29, 2019, which claims the benefit of European Patent Application No. 18192795.5, filed Sep. 5, 2018, the disclosures of which are incorporated herein by reference in their entireties.

TECHNICAL FIELD

The invention relates to a transmission comprising a first component and a second component, which are journaled for rotation relative to each other, and a locking mechanism for rotationally locking the first component and the second component relative to each other in a predetermined mutual rotation position.

BACKGROUND

In some technical fields, a shaft with a propeller may have to be locked against rotation during certain operation conditions. It may be a propeller driven by a motor or a propeller driven by the wind for generating electrical power, for instance.

For example, for a roadable aircraft, such as an aircraft that can be converted into an automotive vehicle capable of driving on a road, the propeller has to be disconnected from the driveline during road driving when the motor drives the wheels. When the propeller is disconnected for road driving, the propeller has to be kept stationary to prevent spinning of the propeller by the wind. Further, for other reasons, such as for reducing the air resistance and achieving balance, the angular position of the propeller will be predetermined, and the propeller will be kept in this specific position in the automotive mode. For a three-bladed propeller where the angular distance between each pair of two adjacent propeller blades is 120°, one propeller blade will usually be kept vertically in an upper position.

A drawback of known locking devices used for locking the propeller during the automotive mode is the addition of components to the transmission making the design more complicated, space-consuming and costly.

SUMMARY

An objective of the invention is to provide a transmission having a lock that can be used for locking a component, such as a propeller, while enabling at least some problem with known locking devices to be reduced or eliminated.

The objective is achieved by a transmission comprising a first component and a second component which are journaled for rotation relative to each other, and a locking mechanism for rotationally locking the first component and the second component relative to each other in a predetermined mutual rotation position, wherein the locking mechanism comprises a sleeve and a dog clutch, and the sleeve is rotationally locked relative to the first component and the dog clutch is rotationally locked relative to the second component, the sleeve and the dog clutch are axially displaceable relative to each other for engagement of the sleeve and the dog clutch such that the first component and the second component are rotationally locked relative to each other, and wherein the sleeve and the dog clutch are engageable only in a mutual rotation position corresponding to the predetermined mutual rotation position of the first component and the second component.

The invention is based on the insight that by such a transmission, the lock for a propeller can be integrated in the transmission with a minimum of additional components in a way making the design less complicated while saving space.

For example, the transmission may have at least two modes selectable by displacement of the sleeve, a first stationary mode where the first component and the second component are locked relative to each other in the predetermined mutual rotation position and a second driving mode where the first component is connected to a drive motor for rotating the first component relative to the second component. Hereby, the lock is integrated in the transmission in a rational way providing a safe lock, since disconnection of the driving mode can be automatically performed when the stationary mode is activated, and vice versa.

It should be stressed that by the expression "predetermined mutual rotation position" is meant a certain position selected for rotationally locking the first component and the second component relative to each other with respect to their respective angular position, as opposed to any random position of a finite number of possible mutual rotation positions provided by a conventional spline joint for instance.

The number of predetermined mutual rotation positions in which the first component and the second component can be locked relative each other by the locking mechanism can be varied. For some applications there is only one such predetermined mutual rotation position. In other applications a few predetermined mutual rotation positions are possible, and often the number of predetermined mutual rotation positions is in the interval 1-5. For example, for a three-bladed propeller, three predetermined mutual rotation positions can be used since it will be possible to lock the propeller in three equivalent positions giving the same symmetry provided that the angular distance between two adjacent propeller blades is 120°.

According to one embodiment, the transmission has a first locking part and a second locking part, where the first locking part and the second locking part are arranged for preventing the sleeve and the dog clutch to be engaged in any other mutual rotation position than a mutual rotation position corresponding to the predetermined mutual rotation position of the first component and the second component. Hereby, the first component and the second component can be locked relative to each other in the predetermined mutual rotation position in a non-complicated way.

The dog clutch can be provided with one of the first locking part and the second locking part and the sleeve can be provided with the other of the first locking part and the second locking part, and preferably the sleeve and the dog clutch are engageable when the rotation position of the first locking part and the rotation position of the second locking part are matching each other.

For example, the dog clutch can have external teeth and the sleeve can have internal teeth for engagement of the sleeve and the dog clutch, and the first locking part can comprise a tooth of the dog clutch which tooth is different from the other teeth of the dog clutch and the second locking part can comprise a gap between two teeth of the sleeve which gap is different from the other gaps of the sleeve, wherein the sleeve and the dog clutch are engageable when the rotation position of said tooth and the rotation position of said gap are matching each other. The tooth and the gap have a size and/or shape different from the other teeth and gaps. The tooth has suitably a width exceeding the width of the remaining teeth, and the gap has a corresponding width exceeding the width of the remaining gaps, making an engagement of the sleeve and the dog clutch possible only when the tooth and the gap are at the same rotation position.

According to a further embodiment, the first locking part is a set of axial protrusions and the second locking part is a set of corresponding recesses for receiving the protrusions, and preferably a play in the rotation direction is arranged such that when the set of protrusions is engaged with the set of corresponding recesses, the first component and the second component can be somewhat rotated relative to each other before engagement of the sleeve and the dog clutch by an engagement means, such as a spline joint for instance. Hereby, it can be ensured that the locking parts are used only for achieving the desired rotation position while the engagement means is used for transferring any torque required.

For example, the play can be arranged by having the size of the recesses exceeding the size of the protrusions, and the size of the play is adapted to the engagement means ensuring that any torque is transferred by the engagement means when the sleeve and the dog clutch are engaged by the engagement means.

According to a further embodiment, an additional ring is rotationally locked to the sleeve, where the ring is provided with the set of protrusions or the set of recesses, and preferably the play in the rotation direction is arranged between the additional ring and the sleeve. Hereby, it can be ensured that any torque is transferred by the engagement means. Further, the sleeve can be designed with minor amendments from a conventional sleeve, such as a synchronizer sleeve, since the current locking part is provided by the additional ring.

According to a further embodiment, the transmission comprises a spring arranged for moving the sleeve and the dog clutch axially relative to each other such that the sleeve and the dog clutch are brought into engagement, and preferably the dog clutch is axially displaceable relative to the second component and the spring is arranged between the dog clutch and the second component for counteracting displacement of the dog clutch relative to the second component. Hereby, engagement between the sleeve and the dog clutch can be secured by the spring force after some relative rotation between the sleeve and the dog clutch in case the sleeve and the dog clutch do not match each other initially when being brought together.

According to a further embodiment, the sleeve is part of a synchronizer device for synchronizing the rotation speed of the first component relative to the second component when the sleeve and the dog clutch are to be engaged. Hereby, a fast and smooth engagement of the sleeve and the dog clutch can be achieved.

According to another aspect of the invention, a further objective is to provide a roadable aircraft comprising a transmission having a lock that can be used for locking a propeller of the aircraft.

The advantages of the roadable aircraft are substantially the same as the advantages already discussed hereinabove with reference to the different embodiments of the transmission. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1A:
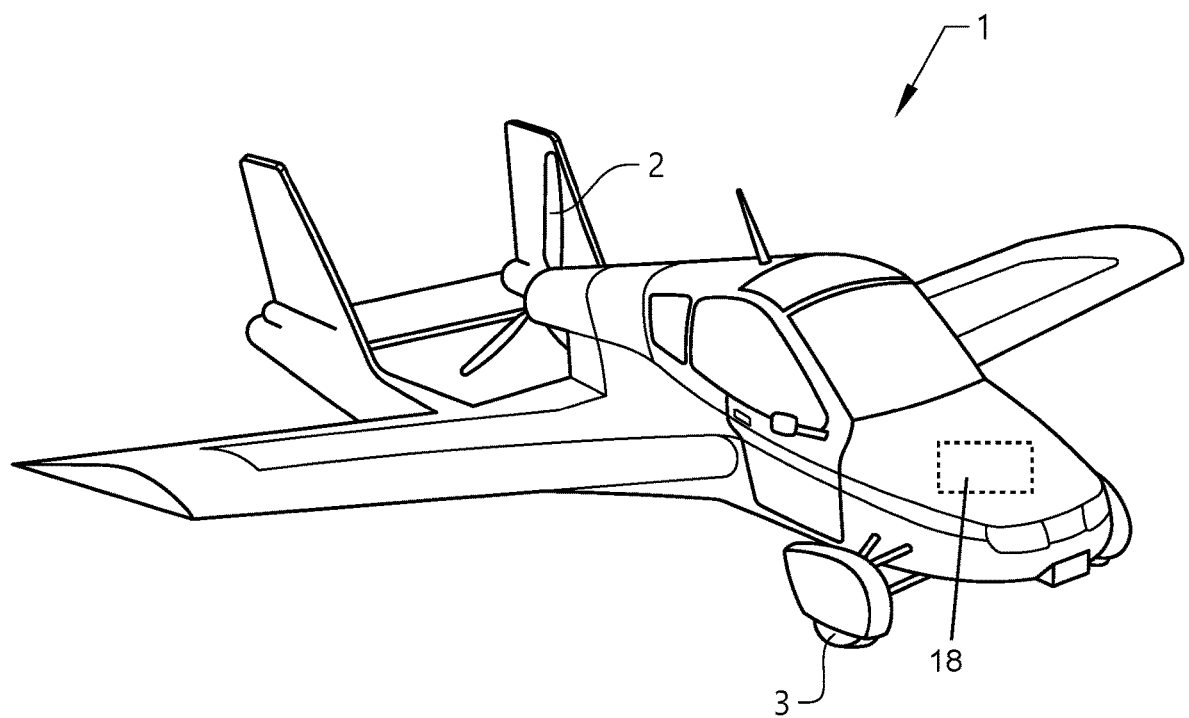
FIG. 1A is a perspective view of a roadable aircraft.
Figure 1B:
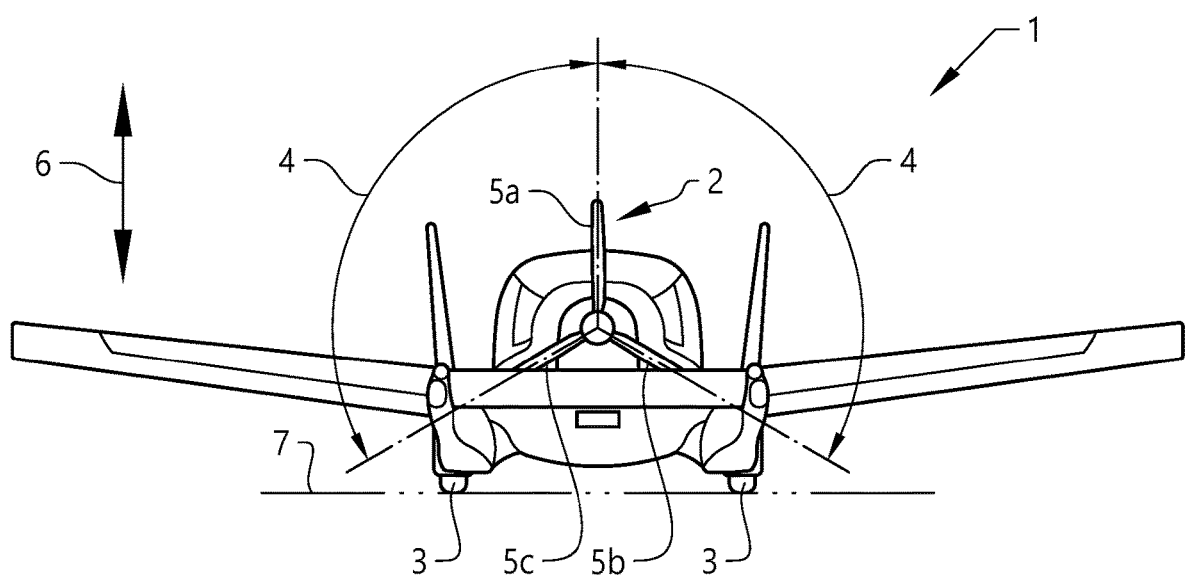
FIG. 1B is a rear view of the roadable aircraft shown in FIG. 1A.

FIGS. 1A and 1B show a roadable aircraft 1. FIG. 1A shows the aircraft 1 in a perspective view and FIG. 1B shows the aircraft 1 in a rear view. The aircraft 1 can be converted into an automotive vehicle capable of driving on a road and interacting with a land-based traffic system. The aircraft 1 is shown when used as an automotive vehicle during road driving. In the automotive mode, the propeller 2 is disconnected from the driveline since the motor is used for driving the wheels 3. When the propeller 2 is disconnected for road driving, the propeller 2 is preferably kept stationary to prevent spinning of the propeller by the wind. For reducing the air resistance and achieving balance, for instance, the propeller 2 will be kept in a specific position in the automotive mode. For a three-bladed propeller 2 as illustrated in FIGS. 1A and 1B, where the angular distance 4 between each pair of propeller blades 5a, 5b; 5b, 5c; 5c, 5a is 120°, one propeller blade 5a will usually be kept vertically in an upper position. Thus, the upper propeller blade 5a is directed in a vertical direction 6, at least as long as the aircraft 1 is standing on a substantially even ground 7, and each of the other propeller blades 5b, 5c is directed obliquely downwards.

The propeller 2 is arranged on a propeller shaft of a transmission of the roadable aircraft 1. The transmission will be described hereinafter with reference to the remaining figures.

Figure 2A:
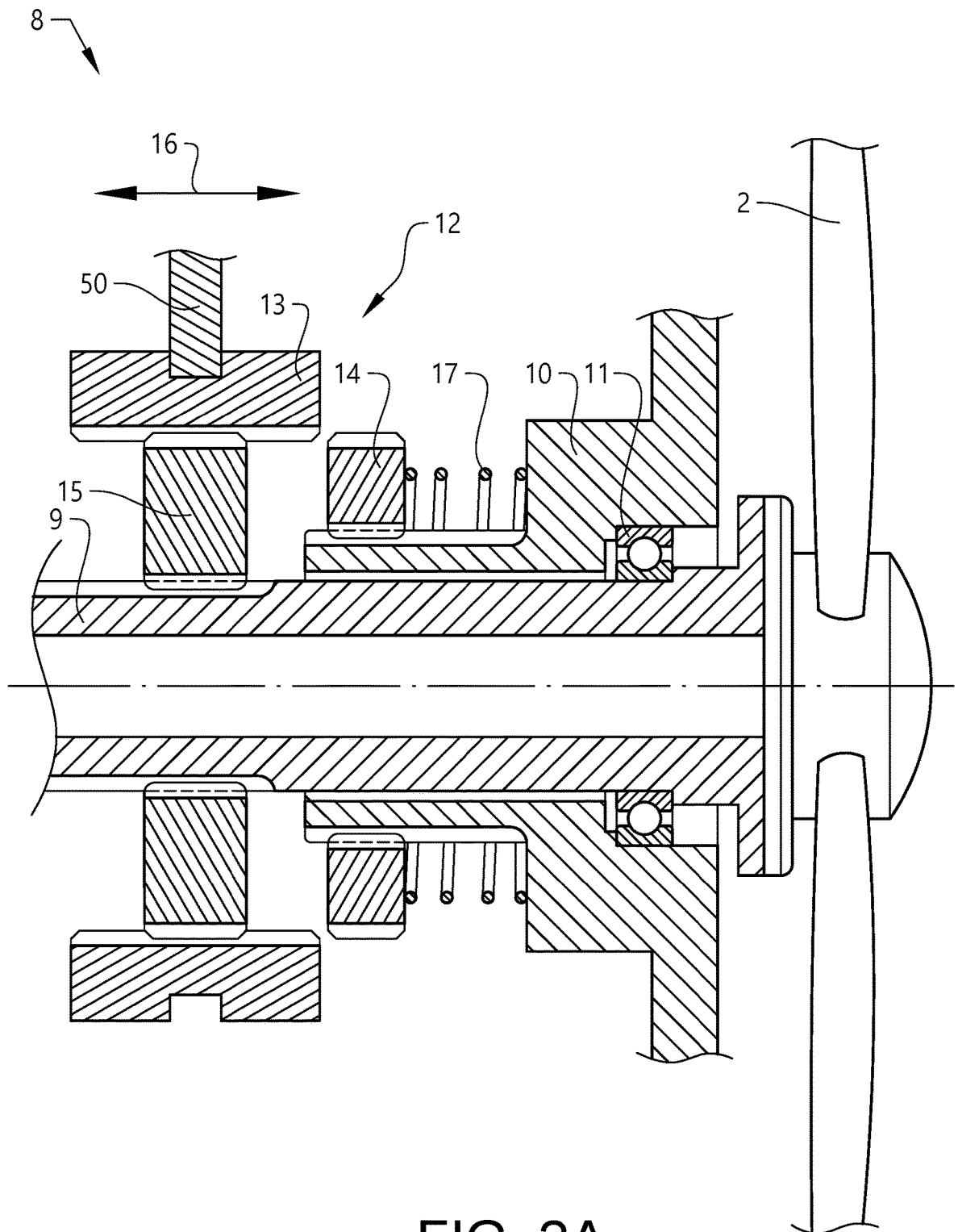
FIG. 2A is a partly cut side view of a transmission in a neutral mode.

FIG. 2A shows the transmission 8 in a partly cut side view. The transmission 8 comprises a first component 9 and a second component 10 which are journaled for rotation relative to each other by a bearing 11. In the example embodiment illustrated in FIG. 2A, the first component is a propeller shaft 9 on which the propeller 2 is arranged and the second component is a housing 10 of the transmission 8. The housing 10 constitutes a fixed point on the aircraft 1.

The transmission 8 further comprises a locking mechanism 12 for rotationally locking the first component 9 and the second component 10 relative to each other in a predetermined mutual rotation position. The locking mechanism 12 comprises a sleeve 13 and a dog clutch 14. By "dog clutch" is meant any equal component that also can be named dog ring, dog teeth or clutch teeth or clutch cone. The sleeve 13 is rotationally locked relative to the first component 9 and the dog clutch 14 is rotationally locked relative to the second component 10. Further, the sleeve 13 and the dog clutch 14 are axially displaceable relative to each other for engagement of the sleeve 13 and the dog clutch 14 such that the first component 9 and the second component 10 are rotationally locked relative to each other. The sleeve 13 and the dog clutch 14 are engageable only in a mutual rotation position corresponding to the predetermined mutual rotation position of the first component 9 and the second component 10. In the example embodiment illustrated in FIG. 2A (and FIGS. 1A and 1B) the predetermined mutual rotation position of the first component 9 and the second component 10 corresponds to a predetermined rotation position of the propeller 2 arranged on the propeller shaft 9. Thus, the propeller 2 is locked relative to the air craft 1 in the way as described hereinabove with reference to FIGS. 1A and 1B.

As examples, the number of predetermined mutual rotation positions of the first component 9 and the second component 10 can be 1 or 3 when using a propeller with three propeller blades. In the first case, it is always the same propeller blade 5a that is directed in the vertical direction 6 when the propeller is locked. However, in the other case, due to the symmetry, the propeller 2 can be locked such that any of the propeller blades 5a, 5b, 5c is directed in the vertical direction 6, since there are three equivalent locking positions for the propeller 2.

As illustrated in FIG. 2A, the transmission 8 suitably comprises a hub 15 arranged on the propeller shaft 9 on which hub 15 the sleeve 13 is arranged. The hub 15 is fixed relative to the propeller shaft 9. The sleeve 13 is rotationally locked to the hub 15 and thereby rotationally locked relative to the propeller shaft 9 but is displaceable in an axial direction 16 relative to the hub 15. The dog clutch 14 is rotationally locked relative to the housing 10 and is suitably displaceable relative to the housing 10 in the axial direction 16. The transmission may comprise a spring 17 arranged for moving the sleeve 13 and the dog clutch 14 in the axial direction 16 relative to each other such that the sleeve 13 and the dog clutch 14 are brought into engagement.

In the example embodiment illustrated in FIG. 2A, the dog clutch 14 is displaceable relative to the second component 10 in the axial direction 16 and the spring 17 is arranged between the dog clutch 14 and the second component 10 for counteracting displacement of the dog clutch 14 relative to the second component 10. The spring 17 can be for example a wave spring or coil spring.

The sleeve 13 can be displaceable in the axial direction 16 by means of a shift fork 50 of a gear actuator as schematically illustrated.

Although, in the example embodiments illustrated, the spring 17 is arranged on the "dog clutch side" between the dog clutch and the second component, in another solution the spring could be arranged on the "sleeve side", for example between an actuator part of the gear actuator (moving the shift fork) and the shift fork, or between the shift fork and the sleeve.

The transmission 8 has preferably at least two modes selectable by displacement of the sleeve 13. In the example embodiment illustrated in FIGS. 2A, 2B, 2C and 2D, the transmission 8 has a first stationary mode where the first component 9 and the second component 10 are locked relative to each other in the predetermined mutual rotation position as previously described hereinabove. The transmission 8 has further a second driving mode where the first component being connected to a drive motor 18 for rotating the first component 9 relative to the second component 10.

Finally, the transmission 8 has also a neutral mode where the first component 9 and the second component 10 are not rotationally locked relative to each other and the first component 9 is disconnected from the drive motor.

In FIG. 2A, the transmission 8 is in the neutral mode, since the sleeve 13 is positioned in a centre position not engaging the dog clutch 14 or any other connection component.

Figure 2B:
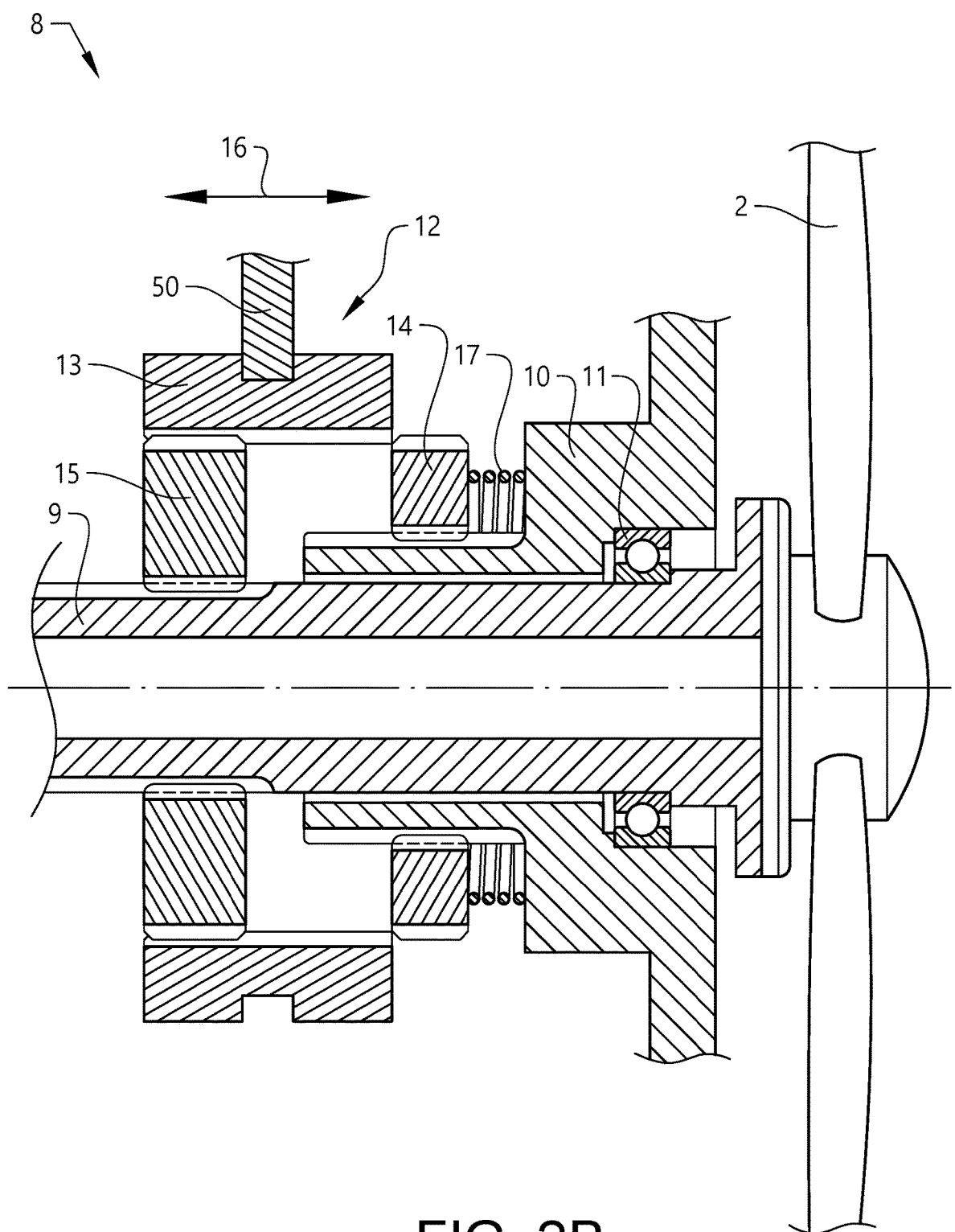
FIG. 2B is the transmission shown in FIG. 2A in an intermediate mode.

In FIG. 2B, the sleeve 13 is displaced in the axial direction 16 towards the dog clutch 14. In this case, initially, the sleeve 13 and the dog clutch 14 are not matching each other with respect to the mutual rotation position, and therefore due to the sleeve motion the dog clutch 14 is pressed by the sleeve 13. Thus, the dog clutch 14 is somewhat displaced relative to the second component 10 in the axial direction 16, to the right, while the displacement motion being counteracted by the spring load created by the spring 17 arranged between the dog clutch 14 and the second component 10. This intermediate mode will end as soon as the first component 9 and the second component 10 have been further rotated relative to each other such that the sleeve 13 and the dog clutch 14 are matching. The spring 17 will then secure that the sleeve 13 and the dog clutch 14 will be brought into engagement with each other to reach the mode where the first component 9 and the second component 10 are locked relative to each other in the predetermined mutual rotation position.

Figure 2C:
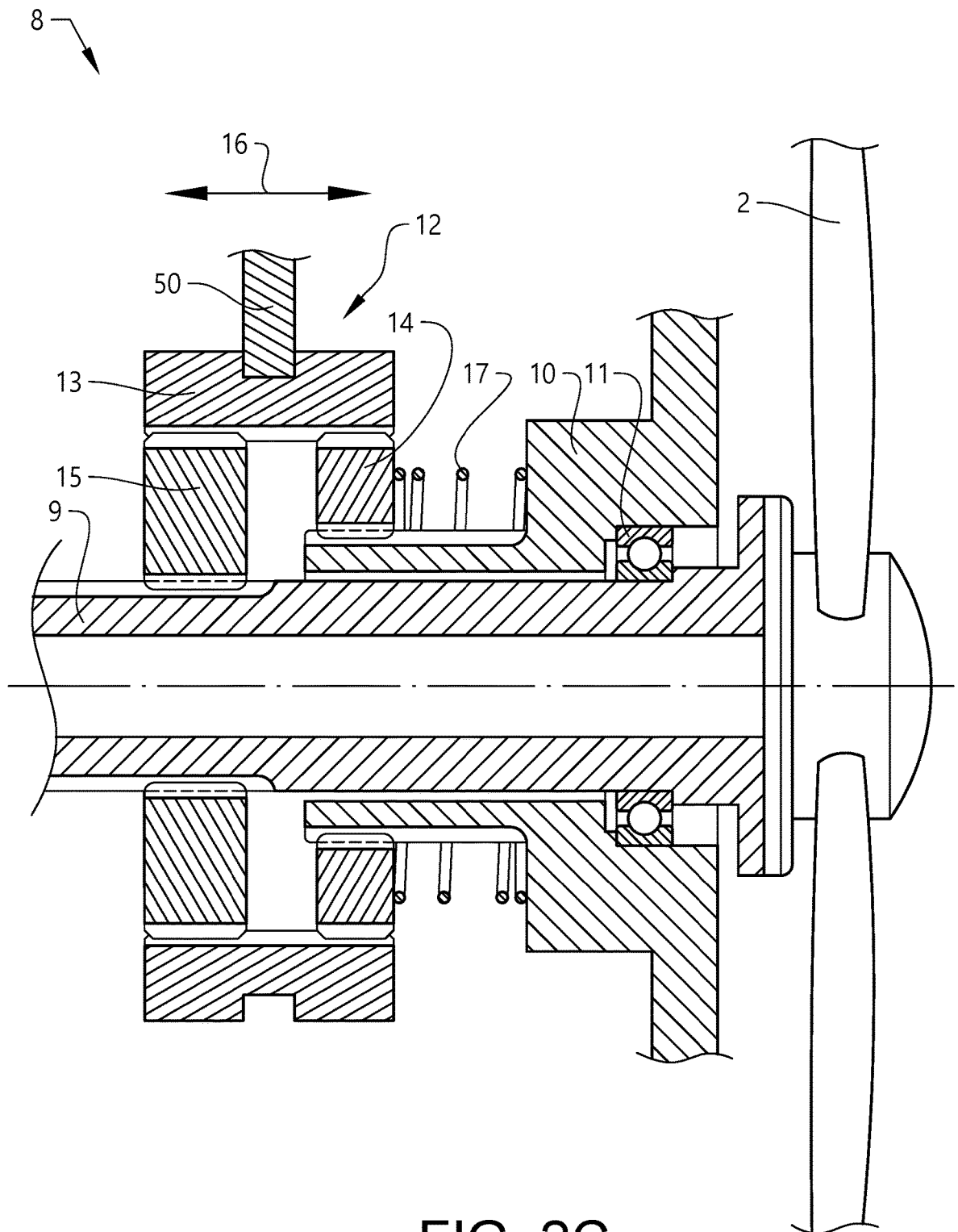
FIG. 2C is the transmission shown in FIG. 2A in a locked mode.

In FIG. 2C, the sleeve 13 and the dog clutch 14 are engaged, rotationally locking the first component 9 and the second component 10 relative to each other in the predetermined mutual rotation position.

Figure 2D:
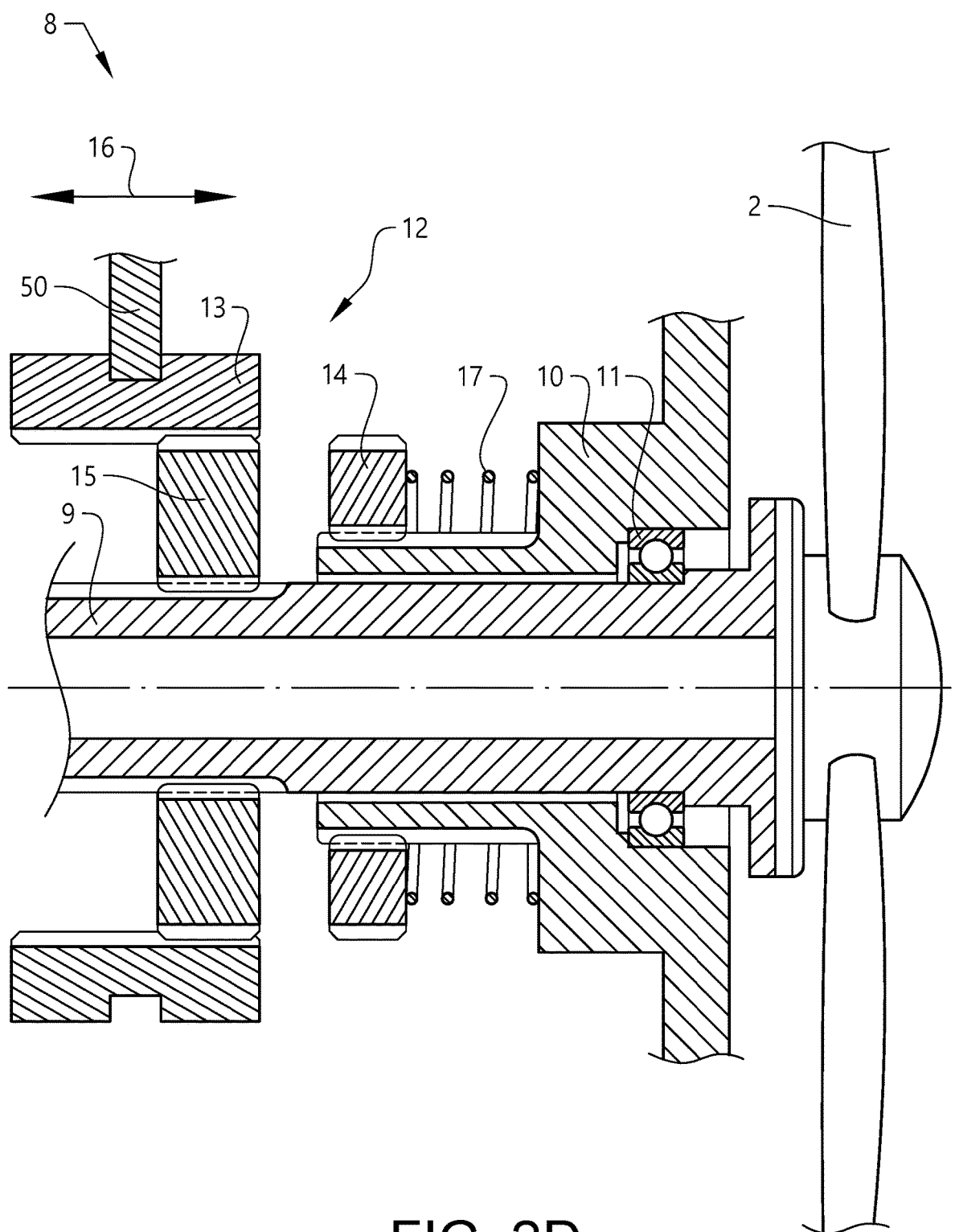
FIG. 2D is the transmission shown in FIG. 2A in a driving mode.

In FIG. 2D, the sleeve 13 is axially displaced in the opposite direction, i.e. to left, for engagement with a further connection component (not shown) connecting the first component 9 to the drive motor for rotating the first component 9 relative to the second component 10. The driving mode can be used for driving the propeller 2 in the flight mode of the aircraft 1.

Figure 3:
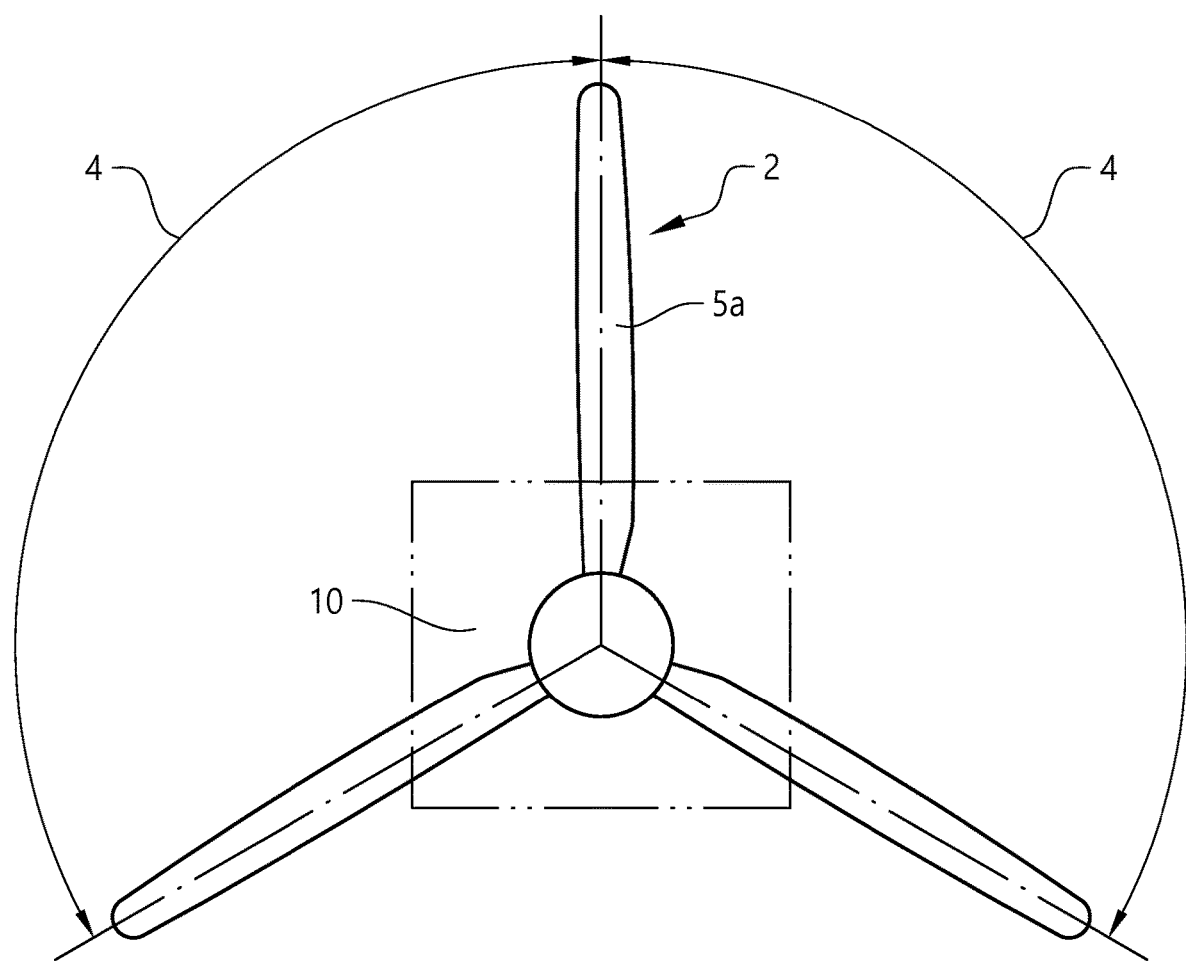
FIG. 3 is an end view of the transmission shown in FIG. 2A in a locked mode.

FIG. 3 shows the transmission 8 in an end view where the transmission is in the locked mode corresponding to FIG. 2C. The propeller shaft 9 and the propeller 2 is locked relative the housing 10 in the predetermined mutual rotation position. One blade 5a of the three-bladed propeller 2 is positioned in the vertical direction 6.

Figure 4A:
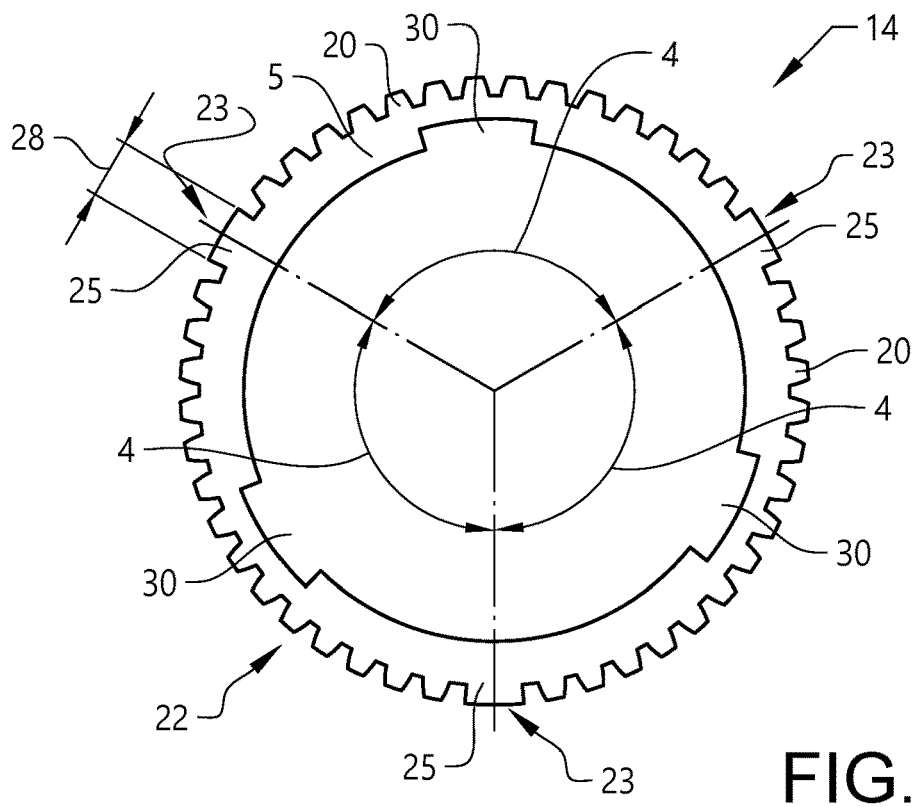
FIG. 4A shows a dog clutch of a locking mechanism.
Figure 4B:
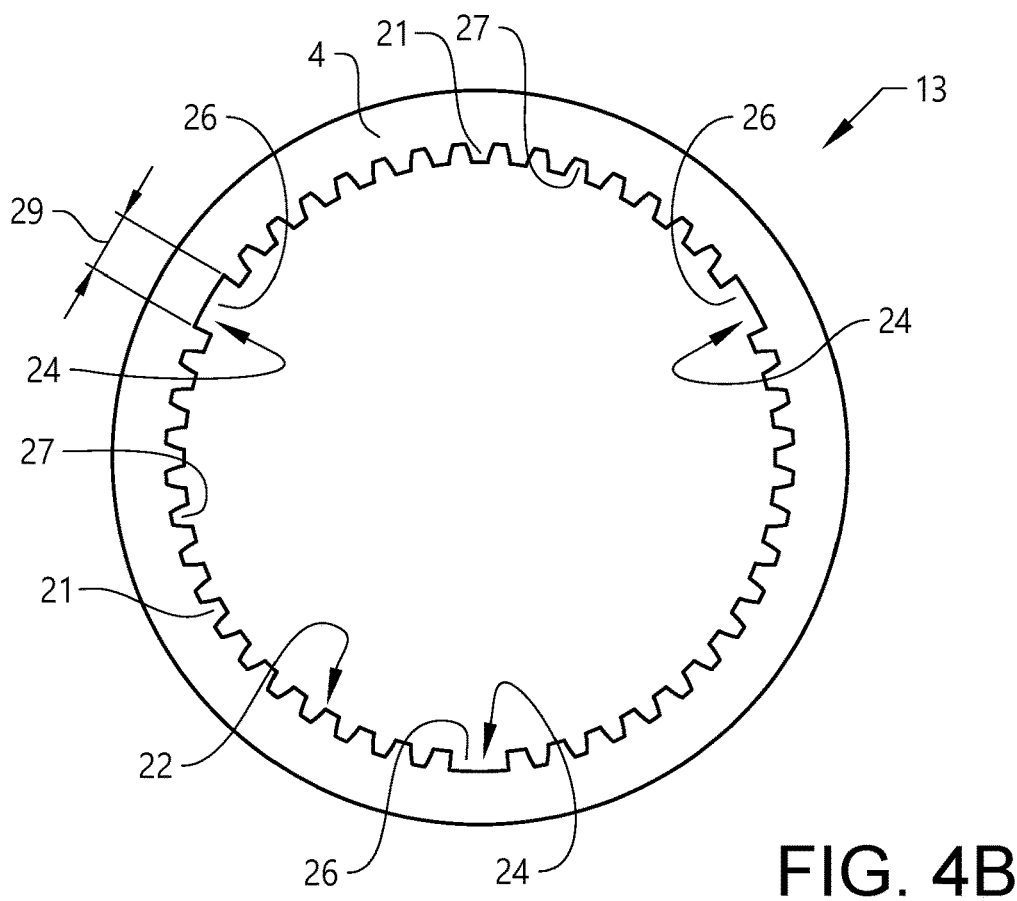
FIG. 4B shows a sleeve of a locking mechanism.

FIG. 4A shows the dog clutch 14 with external splines 20 in a side view. FIG. 4B shows the sleeve 13 with corresponding internal splines 21 in a side view. Although the engagement means for connection of the sleeve 13 and the dog clutch 14 is exemplified by a spline joint 22, in another solution any other suitable engagement means enabling torque to be transferred between the sleeve and the dog clutch could be used.

The transmission has a first locking part 23 and a second locking part 24, the first locking part 23 and the second locking part 24 are arranged for preventing the sleeve 13 and the dog clutch 14 to be engaged in any other mutual rotation position than a mutual rotation position corresponding to the predetermined mutual rotation position of the first component 9 and the second component 10. The dog clutch 14 is preferably provided with one of the first locking part 23 and the second locking part and the sleeve 13 is provided with the other of the first locking part and the second locking part 24. Here, the dog clutch 14 has the first locking part 23 and the sleeve 13 has the second locking part 24. The first locking part 23 and the second locking part 24 are suitably arranged for preventing the sleeve 13 and the dog clutch 14 to be engaged in any other mutual rotation position than a mutual rotation position corresponding to the predetermined mutual rotation position of the first component 9 and the second component 10. Thus, the sleeve 13 and the dog clutch 14 are engageable only when the rotation position of the first locking part 23 and the rotation position of the second locking part 24 are matching each other. As soon as the sleeve and the dog clutch are engaged, this mutual rotation position is preferably kept by the splines 20, 21.

In the example embodiment illustrated in FIGS. 4A and 4B, where the dog clutch 14 has external teeth 20 and the sleeve 13 has internal teeth 21 for engagement of the sleeve 13 and the dog clutch 14, the first locking part 23 comprising a tooth 25 of the dog clutch 14 which tooth 25 is different from the other teeth 20 of the dog clutch 14 and the second locking part 24 comprising a gap 26 between two teeth 21 of the sleeve 13 which gap 26 is different from the other gaps 27 of the sleeve. The sleeve 13 and the dog clutch 14 are engageable when the rotation position of said tooth 25 and the rotation position of said gap 26 are matching each other. The number of such different teeth 25 and different gaps 26 can be varied. In this case there are three teeth 25 and three gaps 26 enabling engagement of the sleeve 13 and the dog clutch 14 in three mutual rotation positions where the angular distance 4 between two adjacent positions is 120°.

The tooth 25 and the gap 26 have a unique size and/or shape which is different from the other teeth 20 and gaps 27. As illustrated, the tooth 25 has suitably a width 28 exceeding the width of the remaining teeth 20, and the gap 26 has a corresponding width 29 exceeding the width of the remaining gaps 27, making an engagement of the sleeve 13 and the dog clutch 14 possible only when the tooth 25 and the gap 26 are at the same rotation position.

Further, in FIG. 4A the dog clutch 14 has recesses 30 for connection to corresponding protruding portions of the second component 10 such that the dog clutch 14 can be rotationally locked relative to the second component 10. The sleeve 13 in FIG. 4B is rotationally locked to the first component 9 by means of the splines 21 connecting to the hub 15 which in turn is rotationally locked to the first component 9. In a way similar to the dog clutch, the hub 15 can have recesses for connection to corresponding protruding portions of the first component 9.

Figure 5:
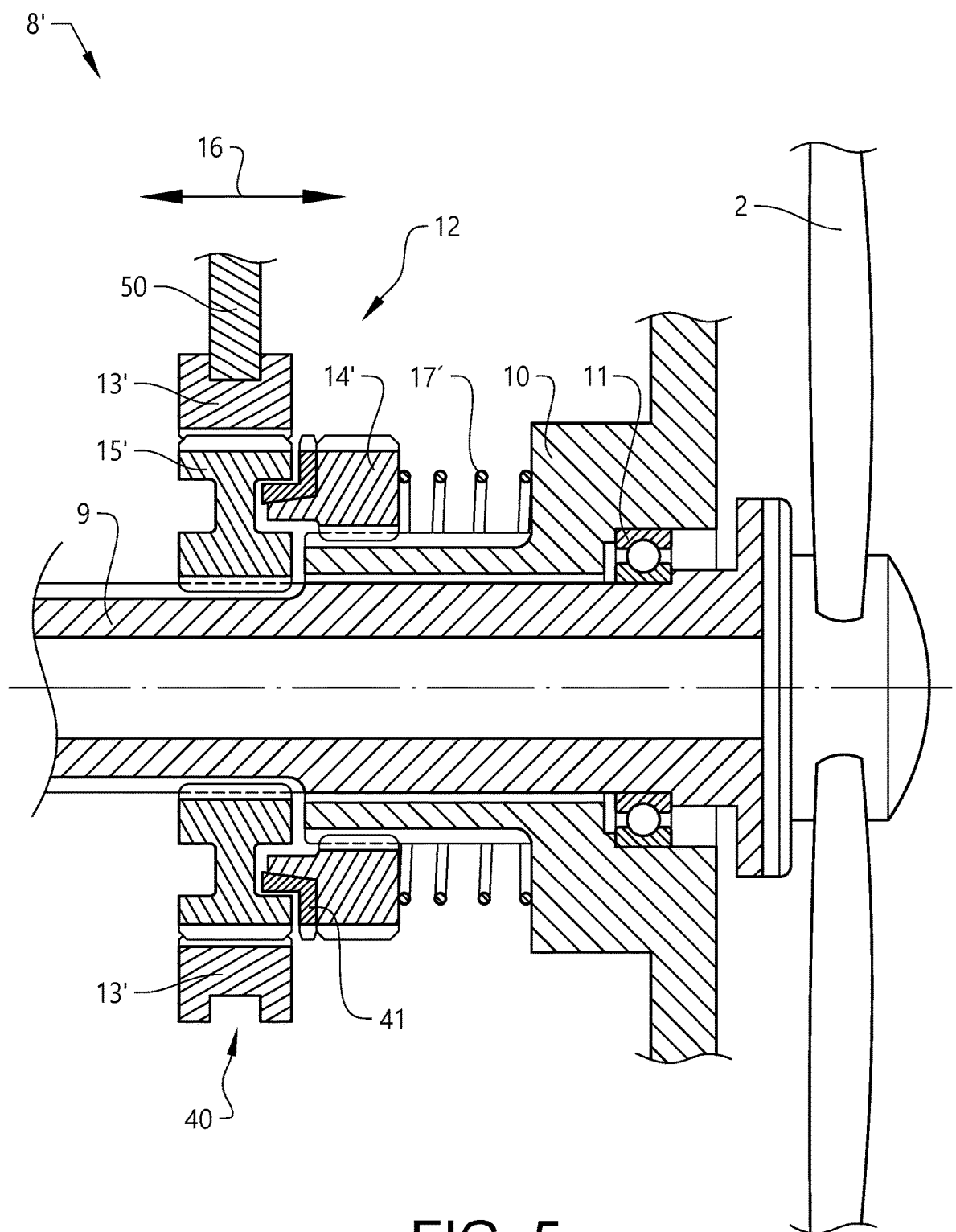
FIG. 5 shows a variant of the transmission in FIG. 2A.

FIG. 5 shows a variant of the transmission 8' where the sleeve 13' is part of a synchronizer device 40 for synchronizing the rotation speed of the first component 9 relative to the second component 10 when the sleeve 13' and the dog clutch 14' are to be engaged. Such a synchronizing device 40 can be designed with one or more synchronizing rings 41 in a way well known to the person skilled in the art.

Although the sleeve and the dog clutch can be engaged in a proper way by a spline joint and locking parts constituted by a radially protruding portion (such as a unique tooth) and a corresponding recess (such as a unique gap), other solutions are also possible. For example, the locking parts can be inverted such that the sleeve has a protruding portion and the dog clutch has a corresponding gap receiving the protruding portion. Further, the protruding portion could protrude in the axial direction instead of the radial direction. In another solution, the locking parts could be used both for allowing locking of the first component and the second component only in the predetermined mutual rotation position and for keeping them in this position without use of any other joint such as splines. In addition, in other example embodiments, the dog clutch is not provided with one of the locking parts but instead this locking part is arranged in another component rotationally locked to the second component.

Figure 6:
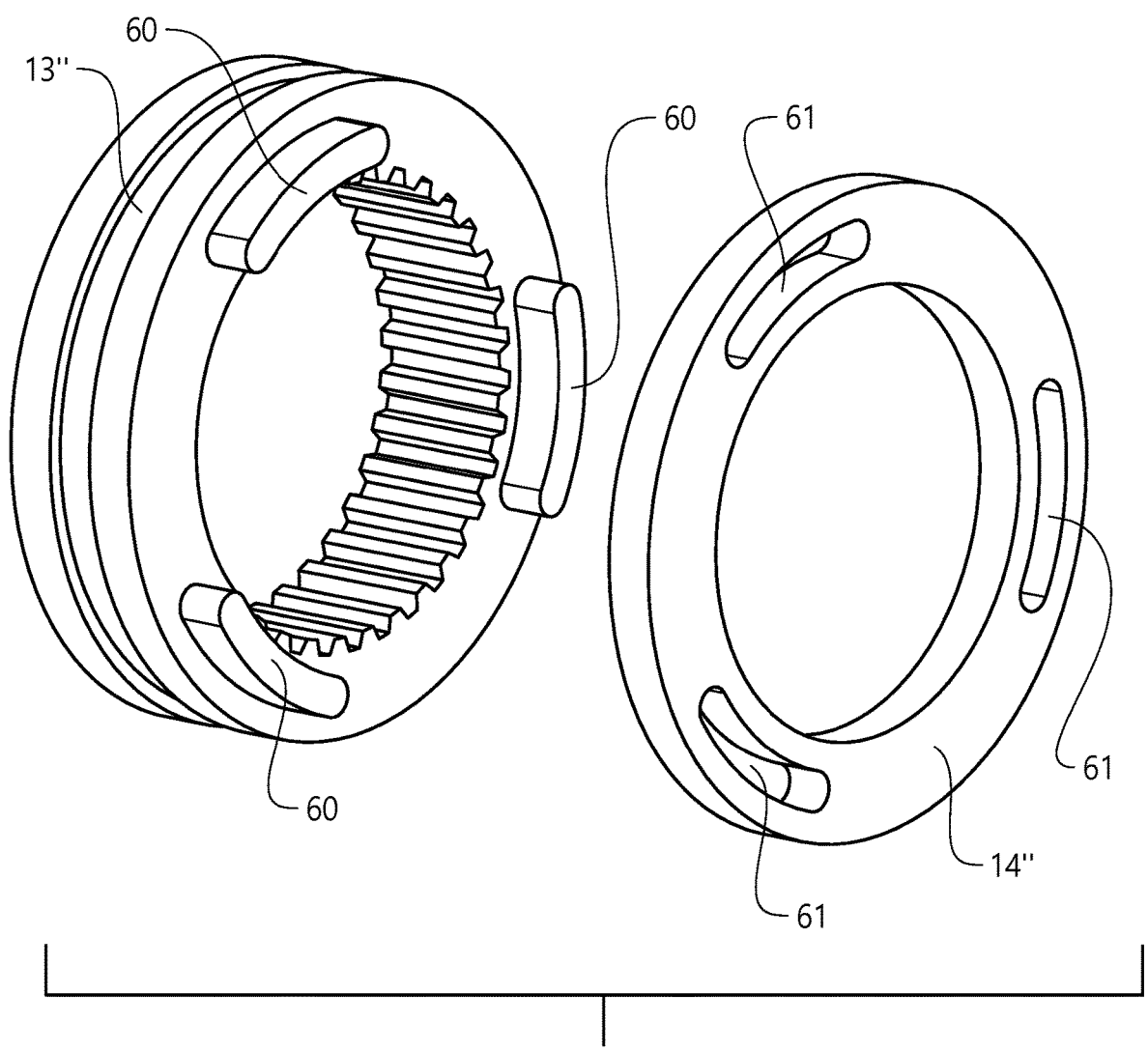
FIG. 6 shows an alternative design of a sleeve and a dog clutch of a locking mechanism.

In FIG. 6 a sleeve 13" and a dog clutch or dog ring 14" with an alternative design are illustrated in a perspective view. The sleeve 13" has protrusions 60 extending in the axial direction and the dog clutch 14" has corresponding holes 61 for receiving the protrusions and enabling engagement of the sleeve and the dog clutch.

Figure 7A:
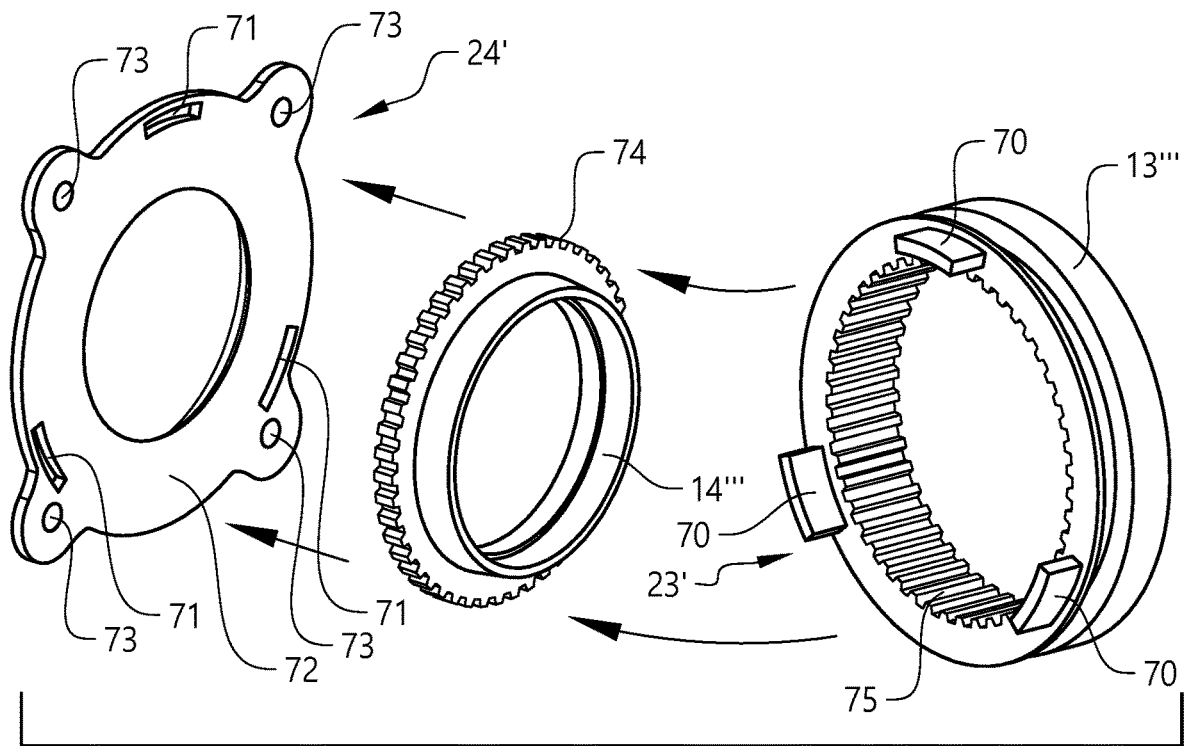
FIGS. 7A and 7B show alternative designs of locking parts.
Figure 7B:
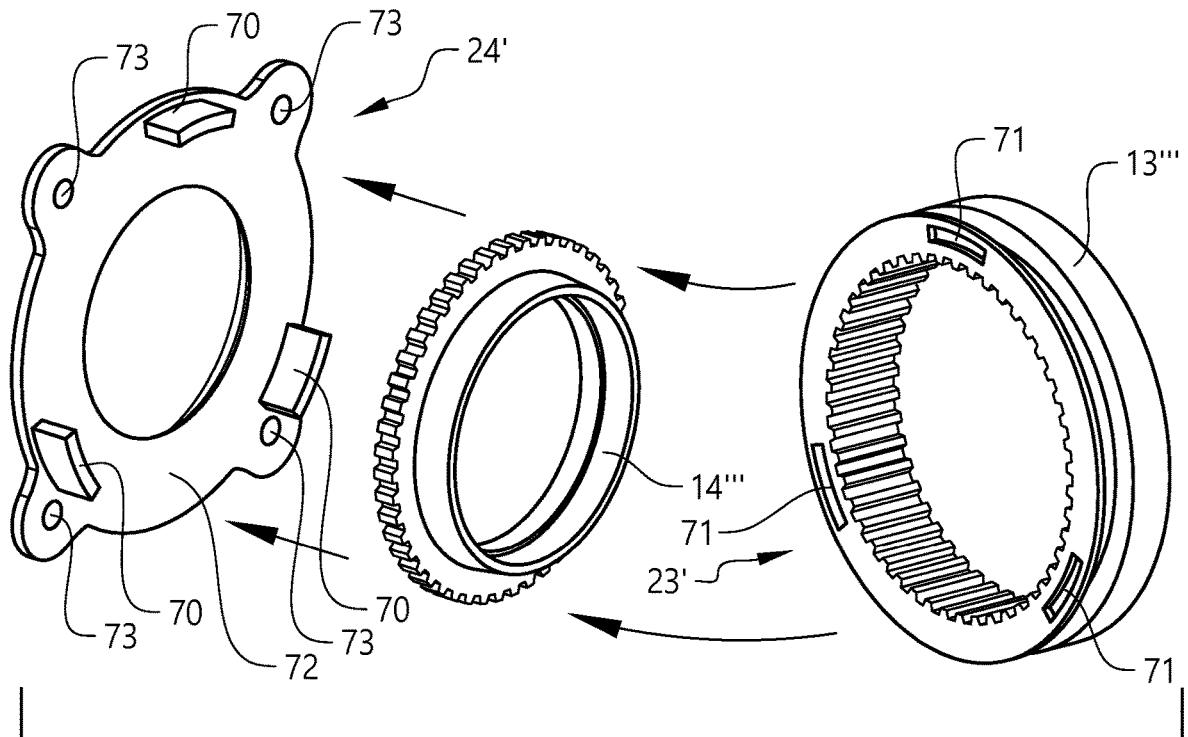

In FIGS. 7A and 7B, further example embodiments are shown. The first locking part 23' is a set of axial protrusions 70 and the second locking part 24' is a set of corresponding recesses 71 for receiving the protrusions 70. Such a set of protrusions may comprise one or more protrusions, preferably 1-5 protrusions, for interacting with a corresponding number of recesses. In FIG. 7A there are three protrusions and three recesses since the first component and the second component are rotationally lockable relative to each other in three equivalent rotation positions. The recesses 71 for receiving the protrusions 70 can be through holes forming openings or slots in a support portion 72 receiving the protrusions 70. The support portion 72 is rotationally locked to the second component. In the example embodiment illustrated in FIG. 7A, the support portion 72 is a plate which has through holes 73 for attachment to the housing. Although the protrusions 70 are arranged on the sleeve 13''' and the recesses 71 in the support portion 72 in FIG. 7A, it would be possible to instead arrange the recesses 71 in the sleeve 13''' and the protrusions 70 on the support portion 72 as illustrated in FIG. 7B. As can be seen from FIG. 7A, the sleeve 13''' has internal splines 75 for movement in the axial direction relative to the hub and the dog clutch 14''' as previously described herein. The dog clutch 14''' is provided with external splines 74 for engagement with the internal splines 75 of the sleeve 13'''. These splines constitute the engagement means for transferring any torque between the sleeve 13''' and the dog ring 14''' when engaged, while the first locking part 23' and the second locking part 24' are used only for initially achieving the predetermined mutual rotation position of the first component and the second component.

The dog clutch may have internal splines for allowing axial movement relative to the second component. In other example embodiments, the dog clutch is instead fixed to the housing also in the axial direction. In such a case, the dog clutch can be attached to the second component either directly or via a further component by welding, gluing, press fit or any other suitable means.

In the example embodiment shown in FIG. 7A, a play is arranged in the rotation direction such that when the set of protrusions 70 is engaged with the set of corresponding recesses 71, the first component and the second component can be somewhat rotated relative to each other before engagement of the sleeve 13''' and the dog clutch 14''' by the engagement means. Such play is relatively small, for example in the order of 0.5-3 mm, preferably 1-2 mm, ensuring that the desired rotation position is achieved.

The play can be obtained by making the size of the recesses 71 slightly exceeding the size of the protrusions 70 in the rotation direction. Further, the size of the play is adapted to the engagement means, which here is the spline joint, ensuring that any torque is transferred by the engagement means when the sleeve 13''' and the dog clutch 14''' are engaged by the engagement means.

Figure 8A:
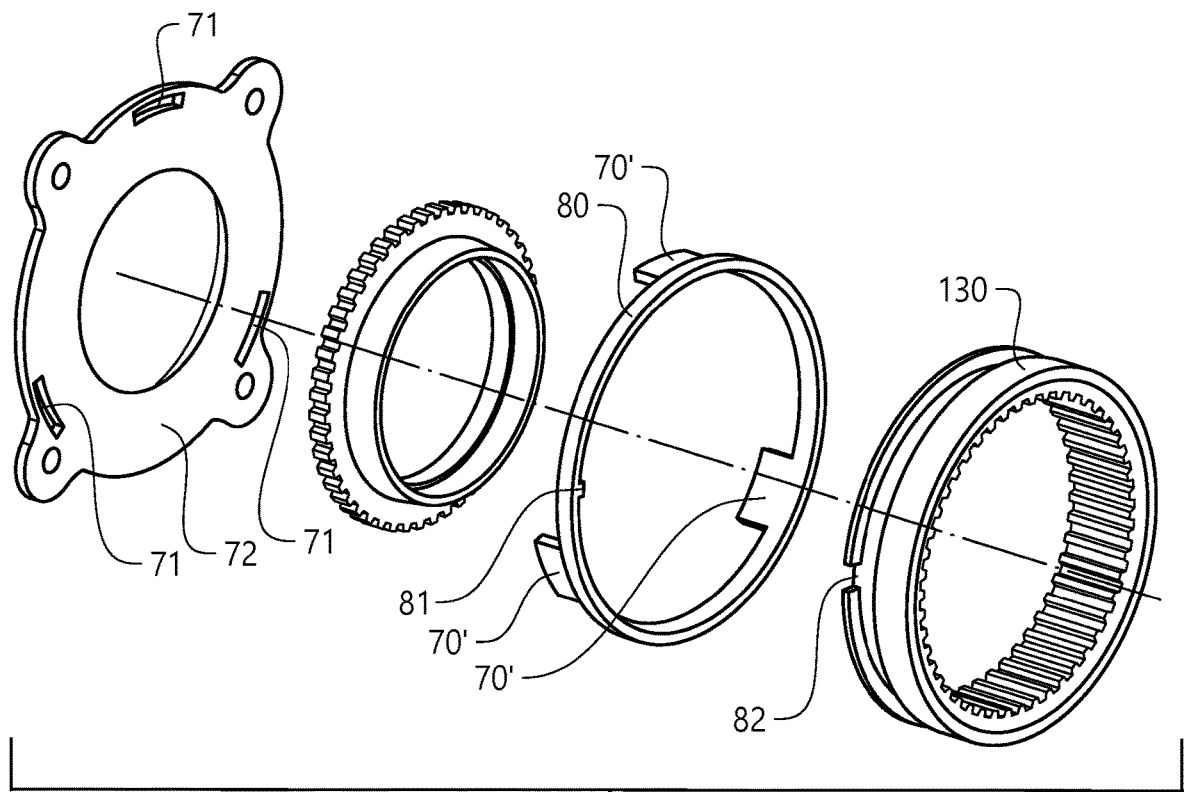
FIGS. 8A and 8B show a further design of the locking parts.
Figure 8B:
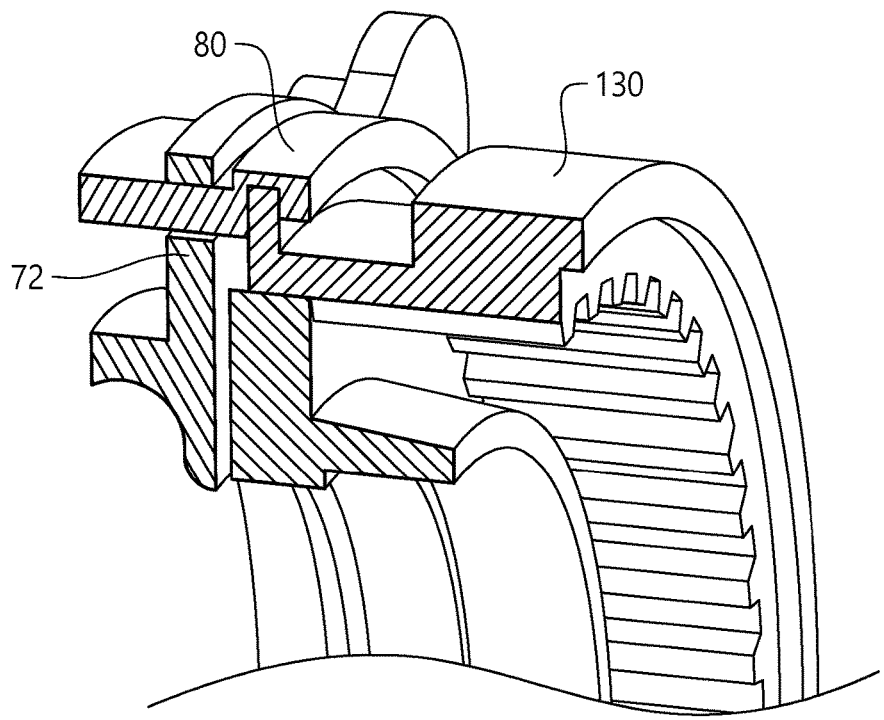

In FIGS. 8A and 8B a further example embodiment comprising an additional ring 80 attached to the sleeve 130 is illustrated. In FIG. 8A, the ring 80 and the sleeve 130 are separated for illustration purposes. When mounted to the sleeve, as illustrated in FIG. 8B, the ring 80 is rotationally locked to the sleeve 130. The ring 80 is also provided with the set of protrusions 70' (or recesses) for engagement with the set of recesses 71 (or protrusions) of the support portion 72.

The ring 80 can be clamped to the sleeve 130 and should be rotationally locked to the sleeve 130. This can be arranged by a further protrusion 81 on the inside of the ring 80 interacting with a corresponding further recess 82 on the outside of the sleeve 130. Further, the ring 80 will follow the movement of the sleeve 130 when being axially displaced towards the dog clutch. By the use of the additional ring 80, a play in the rotation direction can be arranged between the additional ring 80 and the sleeve 130 by making the size of the further recess 82 slightly exceeding the size of the further protrusion 81 in the rotation direction. Such a play can be used instead of or in combination with a play between the protrusions of the ring and the recesses of the support portion.

It is to be understood that the present invention is not limited to the embodiments described above and illustrated in the drawings; rather, the skilled person will recognize that many changes and modifications may be made within the scope of the appended claims.

What is claimed is:

1. A transmission, comprising:
    a first component and a second component that are journaled for rotation relative to each other, the second component configured to be rotationally fixed relative to a vehicle, and
    a locking mechanism for rotationally locking the first component and the second component relative to each other in a locked orientation, the locked orientation being any one of one or more predetermined mutual rotational positions,
    wherein the locking mechanism comprises a sleeve and a dog clutch, the sleeve being rotationally locked relative to the first component and the dog clutch being rotationally locked relative to the second component, and the sleeve and the dog clutch are axially displaceable relative to each other for engagement of the sleeve and the dog clutch such that the first component and the second component are rotationally locked relative to each other in the locked orientation, and wherein the sleeve and the dog clutch are engageable only when the first component and the second component are rotationally aligned in one of the one or more predetermined mutual rotational positions,
    wherein the transmission has a first locking part and a second locking part, the first locking part and the second locking part arranged to prevent the sleeve and the dog clutch from engaging when the first component and the second component are not rotationally aligned in one of the one or more predetermined mutual rotational positions, and
    wherein the first locking part is a set of axial protrusions and the second locking part is a set of corresponding recesses for receiving the protrusions.

2. The transmission according to claim 1, wherein the sleeve and the dog clutch are engageable when a rotational position of the first locking part and a rotational position of the second locking part match each other.

3. The transmission according to claim 1, wherein the dog clutch is provided with one of the first locking part or the second locking part, and the sleeve is provided with the other of the first locking part or the second locking part.

4. The transmission according to claim 1, wherein a play is arranged in the rotation direction such that when the set of protrusions is engaged with the set of corresponding recesses, the first component and the second component have rotational play relative to each other before engagement of the sleeve and the dog clutch.

5. The transmission according to claim 4, wherein the sleeve and the dog clutch engage each other with a spline joint.

6. The transmission according to claim 4, wherein the play is arranged by having a size of the recesses exceed a size of the protrusions, and a size of the play is adapted to an engagement means between the sleeve and the dog clutch to ensure that any torque is transferred by the engagement means when the sleeve and the dog clutch are engaged by the engagement means.

7. The transmission according to claim 4, wherein an additional ring is rotationally locked to the sleeve, the additional ring being provided with the set of protrusions or the set of recesses, and wherein the play in the rotation direction is arranged between the additional ring and the sleeve.

8. The transmission according to claim 1, wherein an additional ring is rotationally locked to the sleeve, the additional ring being provided with the set of protrusions or the set of recesses.

9. The transmission according to claim 1, wherein the first component is a propeller shaft.

10. The transmission according to claim 9, wherein each predetermined mutual rotational position of the first component and the second component corresponds to a respective predetermined rotational position of a propeller arranged on the propeller shaft.

11. The transmission according to claim 1, wherein the sleeve is part of a synchronizer device for synchronizing a rotational speed of the first component relative to the second component when the sleeve and the dog clutch are to be engaged.

12. The transmission according to claim 1, wherein the transmission has at least two modes selectable by displacement of the sleeve, a first stationary mode where the first component and the second component are locked relative to each other in one of the one or more predetermined mutual rotational positions and a second driving mode where the first component is connected to a drive motor for rotating the first component relative to the second component.

13. The transmission according to claim 1, wherein the number of predetermined mutual rotational positions in which the first component and the second component can be locked relative to each other by the locking mechanism is in the interval 1-5.

14. The transmission according to claim 13, wherein said number of predetermined mutual rotational positions is 3.

15. A roadable aircraft comprising a transmission according to claim 1.

16. The roadable aircraft according to claim 15, wherein the first component is a propeller shaft and each predetermined mutual rotational position of the first component and the second component corresponds to a predetermined rotational position of a propeller arranged on the propeller shaft.

17. The roadable aircraft according to claim 16, wherein the propeller has three propeller blades and, in the predetermined rotational position of the propeller, one blade is directed in a vertical direction.

18. A transmission, comprising:
    a first component and a second component that are journaled for rotation relative to each other, and
    a locking mechanism for rotationally locking the first component and the second component relative to each other in a locked orientation, the locked orientation being any one of one or more predetermined mutual rotational positions, wherein the locking mechanism comprises a sleeve and a dog clutch, the sleeve being rotationally locked relative to the first component and the dog clutch being rotationally locked and axially displacable relative to the second component, and the sleeve and the dog clutch are axially displaceable relative to each other for engagement of the sleeve and the dog clutch such that the first component and the second component are rotationally locked relative to each other in the locked orientation, and wherein the sleeve and the dog clutch are engageable only when the first component and the second component are rotationally aligned in one of the one or more predetermined mutual rotational positions, and wherein the transmission comprises a spring arranged between the dog clutch and the second component to counteract displacement of the dog clutch relative to the second component and to move the sleeve and the dog clutch axially relative to each other such that the sleeve and the dog clutch are brought into engagement.

19. A transmission, comprising:
a first component and a second component that are journaled for rotation relative to each other, and
a locking mechanism for rotationally locking the first component and the second component relative to each other in a locked orientation, the locked orientation being any one of one or more predetermined mutual rotational positions, wherein the locking mechanism comprises a sleeve and a dog clutch, the sleeve being rotationally locked relative to the first component and the dog clutch being rotationally locked relative to the second component, and the sleeve and the dog clutch are axially displaceable relative to each other for engagement of the sleeve and the dog clutch such that the first component and the second component are rotationally locked relative to each other in the locked orientation, and wherein the sleeve and the dog clutch are engageable only when the first component and the second component are rotationally aligned in one of the one or more predetermined mutual rotational positions, and wherein the second component is a housing of the transmission.

* * * * *